Feb. 2, 1960 K. B. SWAN 2,923,759
TEMPERATURE CONTROLLER
Filed Jan. 10, 1955
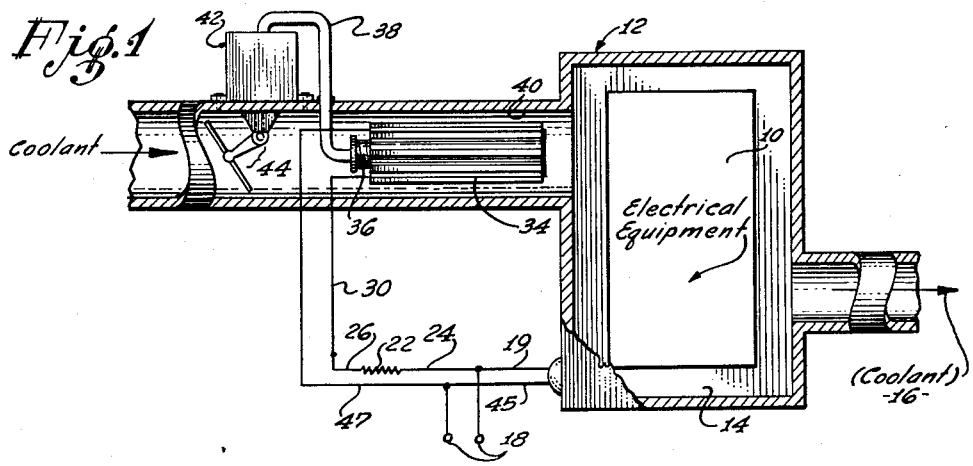
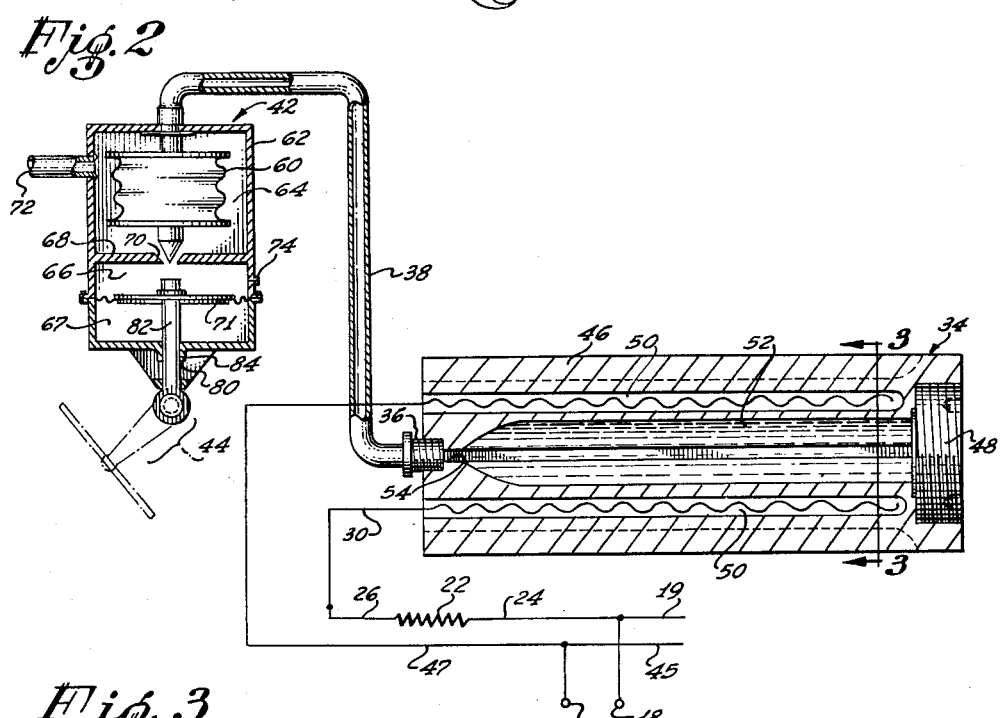
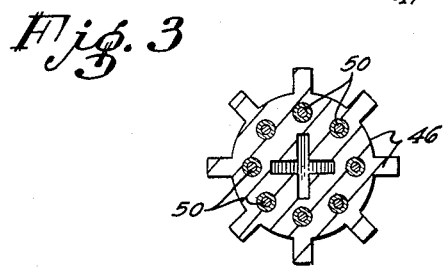
INVENTOR:
Kaye B. Swan
By Hubert E. Metcalf
His Patent Attorney

United States Patent Office 2,923,759
Patented Feb. 2, 1960

2,923,759

TEMPERATURE CONTROLLER

Kaye B. Swan, Los Angeles, Calif., assignor to Northrop Corporation, Hawthorne, Calif., a corporation of California Application January 10, 1955, Serial No. 480,679

8 Claims. (Cl. 174—11)

This invention has to do with temperature sensitive instruments and more particularly with temperature controllers.

The problem of adequately controlling heat generated and absorbed by powerful electronic equipment is increasing and the efficiency is being greatly reduced for the reason that a sensitive and reliable method of heat control has not heretofore been available.

The principal object of this invention is to provide a temperature controller that actuates structure to cool powerful electronic equipment when a heat sensitive fluid expands.

Another object of this invention is to provide a temperature controller that is compact in size for use in restricted areas.

A yet further object of this invention is to provide a temperature controller that incorporates physical laws related to fluids and heat that results in a fluid expanding or contracting to actuate a valve linkage.

Another object of this invention is to provide a temperature controller that incorporates the use of two fluids for actuating structure to cool powerful electronic equipment; one being a gas is infinitely compressible and the other, a liquid, is incompressible.

A yet further object of this invention is to provide a temperature controller that is responsive to the same source of energy as the equipment it causes to be cooled, uses a small portion of the energy supplied as compared to the aforementioned equipment, and is readily and sensitively responsive to changes in temperature of the electrical equipment.

Figure 1 is a schematic view illustrating the operation and relationship of the various elements and having embodied therein the present invention.

Figure 2 is an enlarged, fragmentary view of the sensing element and actuator, parts being broken away to reveal details of structure.

Figure 3 is a transverse, cross-sectional view taken on line 3—3 in Figure 2 looking in the direction indicated.

Referring to the figures for a more detailed explanation of the present invention, 10 designates powerful electronic equipment disposed in chamber 14 of a coolant duct broadly designated 12; the latter having a coolant discharge or outlet 16 located therein.

The electronic equipment receives its energy from source 18 via lead 19 connected thereto.

A resistor 22 is also connected to source 18 by lead 24, and the former, through lead 26, is connected to a plurality of leads represented by 30 that are in turn connected to a sensing element 34. Sensing element 34, for purposes to be hereinafter further referred to is considerably smaller in size than the electronic equipment 10, and is disposed in coolant duct 12 on the inlet side 40 thereof in advance of the aforementioned electronic equipment 10.

A capillary tube 38 connects the actuator broadly designated 42 with the sensing element 34 through the medium of a threaded, hollow plug 36. Secured to the actuator 42 and disposed in the inlet 40 of the duct 12, in advance of the sensing element 34, is valve and linkage assembly 44. The completion of the electrical circuit from the electronic equipment 10 and sensing element 34 is through electrical leads 45 and 47 respectively.

Attention is directed to Figures 2 and 3 for a more detailed view of the sensing element 34 and actuator 42.

The sensing element 34 comprises a hollow, finned body 46 having a plug 48 in one end thereof to render the same closed. Secured and disposed within the body 46 are a plurality of electrical current sensitive rods 50 that are connected to electrical leads 30 and an expandable liquid 52 that when heated expands through a restricted opening 54, and aforementioned plug 36, formed and secured in the body respectively in opposed relationship to plug 48. The capillary, fluid-carrying tube 38, as aforestated, is secured to the plug 36, and is also connected to an accordion needle valve 60 disposed within housing 62 of the actuator 42. It is to be understood that the body 46, capillary tube 38 and needle valve 60 are all filled with the liquid 52.

The housing 62 is divided into three main compartments 64, 66 and 67 by a partition 68, having a needle valve seat and opening 70 constructed therein, and a flexible diaphragm 71. Compartment 64 has an inlet conduit 72 connected thereto through which compressed air passes to enter into the aforementioned compartment.

Compartment 64 has an inlet conduit 72 connected thereto through which compressed air passes to enter into the aforementioned compartment.

Compartment 66 has a conventionally controlled bleeder opening 74 therein in opposed relationship to said conduit 72. Diaphragm 71 has secured thereto and extending outwardly from compartment 67 through an opening 80, an elongated rod or shaft 82. Rod 82 is supported and guided in its reciprocable path of travel by a collar 84. Secured to rod 82 is the aforementioned valve and linkage assembly 44 that is located in the coolant duct 12 on the inlet side 40 thereof, in advance of the sensing element 34, to open and close the same as the actuator 42 is caused to respond to the changes in the fluid 52.

The operation of the temperature controller is as follows:

Initially it is to be understood that the liquid 52 may be any that has expandable qualities when heated. The choice would depend on the required sensitivity of expansion and contraction.

Attention is directed to the aforementioned statement that the sensing element 34 is considerably smaller than the electronic equipment. Therefore it is to be assumed that less amperage is required to heat rods 50 and raise the temperature of the liquid 52 therein than is required to heat the electronic equipment. Further, electronic equipment 10 will require a greater length of time to heat, throughout, than the sensing element by virtue of the differential in size. Phrased in another way, the sensing element 34 will get hotter sooner than the electronic equipment 10 and on less amperage. Therefore, in order that a controlled operation of the actuator 42 is obtained, a resistor 22 is placed in the circuit that will effectively control the amperage in order that the liquid is not heated too readily. Once the value of the resistor is obtained it becomes fixed.

The liquid 52 in the sensing element 34 is first calibrated, in relation to the electronic equipment 10, by imposing the necessary current, to have its surface temperature equal the surface temperature of the said electronic equipment 10 to be cooled at a condition when the design value of coolant flow, coolant temperature, equipment power, and equipment temperature are satisfied.

In other words, an average temperature is determined between a temperature that is so warm as to lower the efficiency and shorten the life of the electronic equipment and one that becomes so cool as to effect function. Thus calibrated the sensing element temperature will follow the equipment temperature regardless of change of coolant flow or coolant temperature.

The electronic equipment can be a radio, or any other electrical device that is prone to heat as the electrical energy is applied thereto. It is of common knowledge that a portion of applied electrical energy is dissipated in heat as a result of electronic tubes, resistors and the like heating, which affects the temperature of the entire equipment.

The electrical energy is transmitted from source 18 through lead 19 to the electronic equipment 10 and to the sensing element 34 through leads 30, resistor 22, leads 26 and 24.

As the electrical energy is applied to equipment 10, this same condition is transmitted to the resistor 22 which reduces the amperage. The reduced amperage is conducted through leads 30 to the rods 50 in the sensing element 34 to heat the same. This heat is in turn transmitted to the expandable liquid 52 throughout the controller. Due to the heat being transmitted thereto the liquid 52 expands to extend the accordion needle valve 60 into the seated condition shutting off the flow of high pressure air through conduit 72 into compartment 66. The compartment 66 has the entrapped air bled therefrom through opening 74. The diaphragm 76 has as a result of these described conditions, no force imposed thereon. Therefore, the force of the coolant through the inlet 40 of the duct 12 actuates the valve and linkage 44 to open the same to place in coolant access the sensing element 34 and the electronic equipment 10. The result of such a condition is that the liquid 52 as well as the electronic equipment is cooled. Cooling of the liquid 52 causes a contraction thereof which reduces the force imposed on accordion needle valve 60. When the force is less than the high pressure air in conduit 72, the air actuates the needle valve 60 to lift it from the seat and opening 70. With access to compartment 66 available the air enters therein to impose a force on diaphragm 71 which in turn is transmitted to the valve and linkage 44 to close the inlet side 40 of the duct 12.

The result of the aforedescribed operation is that before the electronic equipment begins to materially heat beyond its normal operating condition the trend is anticipated by the sensing element and both are submitted to a coolant bath that maintains the same at the optimum temperature.

Current as used throughout the foregoing refers to amperes and energy refers to electric motive force.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A temperature controller comprising a coolant duct; electrical equipment disposed in said duct and actuated by electrical energy transmitted thereto; a coolant responsive sensing element having at least one heater therein disposed in said duct, interconnected to said electrical equipment and responsive to the same source of energy that actuates the latter; and structure interconnected to said sensing element and actuated thereby to open and close said duct to cool said electrical equipment and said sensing element.

2. A temperature controller comprising a coolant duct; electrical equipment disposed in said duct and actuated by electrical energy transmitted thereto; a coolant responsive sensing element having at least one heater therein disposed in said duct, interconnected to said electrical equipment and responsive to the same source of energy that actuates the latter; and structure interconnected to said sensing element and actuated thereby to open and close said duct to cool said electrical equipment and said sensing element; said sensing element including an expandable fluid.

3. A temperature controller comprising a coolant duct; electrical equipment disposed in said duct and actuated by electrical energy transmitted thereto; a coolant responsive sensing element disposed in said duct, interconnected to said electrical equipment and responsive to the same source of energy that actuates the latter; and structure interconnected to said sensing element and actuated thereby to open and close said duct to cool said electrical equipment and said sensing element; said structure including a diaphragm actuated valve.

4. A temperature controller comprising a coolant duct; electrical equipment disposed in said duct and actuated by electrical energy transmitted thereto; a coolant responsive sensing element disposed in said duct, interconnected to said electrical equipment and responsive to the same source of energy that actuates the latter; and structure interconnected to said sensing element and actuated thereby to open and close said duct to cool said electrical equipment and said sensing element; said structure including an accordion valve.

5. A temperature controller comprising a coolant duct; electrical equipment disposed in said duct and actuated by electrical energy transmitted thereto; a body in said duct; a heater and heat transmitting means in the body and connected to said electrical equipment and subject to the same source of energy; a coolant responsive substance in said body that is also responsive to the heat emanating from said means; and structure interconnected to said substance and actuated thereby to open and close said duct to cool said electrical equipment and said substance.

6. A temperature controller comprising a coolant duct; electrical equipment disposed in said duct and actuated by electrical energy transmitted thereto; a body in said duct; a heater and heat transmitting means in the body and connected to said electrical equipment and subject to the same source of energy; a coolant responsive substance in said body that is also responsive to the heat emanating from said means; and structure interconnected to said substance and actuated thereby to open and close said duct to cool said electrical equipment and said substance; said substance being an expandable fluid.

7. A temperature controller comprising a coolant duct; electrical equipment disposed in said duct and actuated by electrical energy transmitted thereto; a body in said duct; a heat transmitting means in the body and connected to said electrical equipment and subject to the same source of energy; a coolant responsive substance in said body that is also responsive to the heat emanating from said means; and structure interconnected to said substance and actuated thereby to open and close said duct to cool said electrical equipment and said substance; said structure including a diaphragm actuated valve.

8. A temperature controller comprising a coolant duct; electrical equipment disposed in said duct and actuated by electrical energy transmitted thereto; a body in said duct; a heat transmitting means in the body and connected to said electrical equipment and subject to the same source of energy; a substance in said body responsive to the heat emanating from said means; and structure interconnected to said substance and actuated thereby to open and close said duct to cool said electrical equipment and said substance; said structure including an accordion valve.

(References on following page)

References Cited in the file of this patent

UNITED STATES PATENTS

| | | |
|---|---|---|
| 1,310,097 | Treanor | July 15, 1919 |
| 1,467,843 | Dann | Sept. 11, 1923 |
| 1,543,654 | Coolidge | June 23, 1925 |
| 2,083,611 | Marshall | June 15, 1937 |
| 2,547,882 | Norton | Apr. 3, 1951 |
| 2,572,582 | Andrews | Oct. 23, 1951 |
| 2,682,173 | Camilli | June 29, 1954 |

FOREIGN PATENTS

| | | |
|---|---|---|
| 566,624 | France | Feb. 18, 1924 |